United States Patent [19]
Van Orden

[11] Patent Number: 5,074,509
[45] Date of Patent: Dec. 24, 1991

[54] PLUMB BOB SUPPORT

[76] Inventor: William T. Van Orden, 43 Cedarbrook La., Tuckerton, N.J. 08087

[21] Appl. No.: 524,552

[22] Filed: May 17, 1990

[51] Int. Cl.⁵ ............................................. F16M 13/00
[52] U.S. Cl. .................................. 248/231.5; 269/239; 33/286
[58] Field of Search ................. 248/542, 62, 74.4, 214, 248/231.5, 231.6, 317, 323, 324; 269/902, 239, 243; 33/286, 353, 369, 373, 392, 370, 371, 376, 783, 807, 808

[56] References Cited

U.S. PATENT DOCUMENTS

| | | | |
|---|---|---|---|
| 953,131 | 3/1910 | Ferris | 33/373 |
| 1,134,125 | 4/1915 | Hafner | 33/286 |
| 1,170,384 | 2/1916 | Zerck | 33/808 |
| 1,226,337 | 5/1917 | Lackner | 33/808 |
| 1,235,279 | 7/1917 | Bernier | 33/353 |
| 2,762,128 | 9/1956 | Whelan | 33/353 |
| 2,841,881 | 7/1958 | Baldwin | 33/376 |
| 3,068,573 | 12/1962 | Sidwell | 33/286 |
| 4,363,475 | 12/1982 | McCarty | 269/902 |
| 4,483,059 | 11/1984 | Dearman | 269/902 |
| 4,799,639 | 1/1989 | Riley | 248/231.5 |

FOREIGN PATENT DOCUMENTS

| | | | |
|---|---|---|---|
| 2504643 | 10/1982 | France | 248/62 |
| 249690 | 5/1948 | Switzerland | 269/239 |

Primary Examiner—Alvin C. Chin-Shue
Assistant Examiner—Robert A. Olson
Attorney, Agent, or Firm—Fleit, Jacobson, Cohn, Price, Holman & Stern

[57] ABSTRACT

A plumb bob support adapted for use by pipe fitters by which the plumb bob can be quickly and accurately suspended from a pipe or similar cylindrical object with the plumb bob being aligned with the center of the pipe thereby enabling the plumb bob to accurately indicate a center point of the pipe on a surface below the pipe. The support includes a pair of elongated, arcuate arms generally in the form of a caliper used for measuring outside diameters of pipes and the like with pipe engaging clips or jaws mounted on the facing ends of the arms by a universal ball and socket connection. The arms are pivotally connected and include a swively mounted hook to which the plumb bob can be connected. The arms also include laterally extending pins on which a bubble level can be supported to accurately position the pipe engaging clips in horizontal alignment thereby assuring that the hook and thus the plumb bob will be accurately aligned with the center line of the pipe. An adjustment screw and nut arrangement is used to move the arms to clampingly engage the pipe engaging clips or enable the arms to move apart when releasing the support from the pipe.

4 Claims, 1 Drawing Sheet

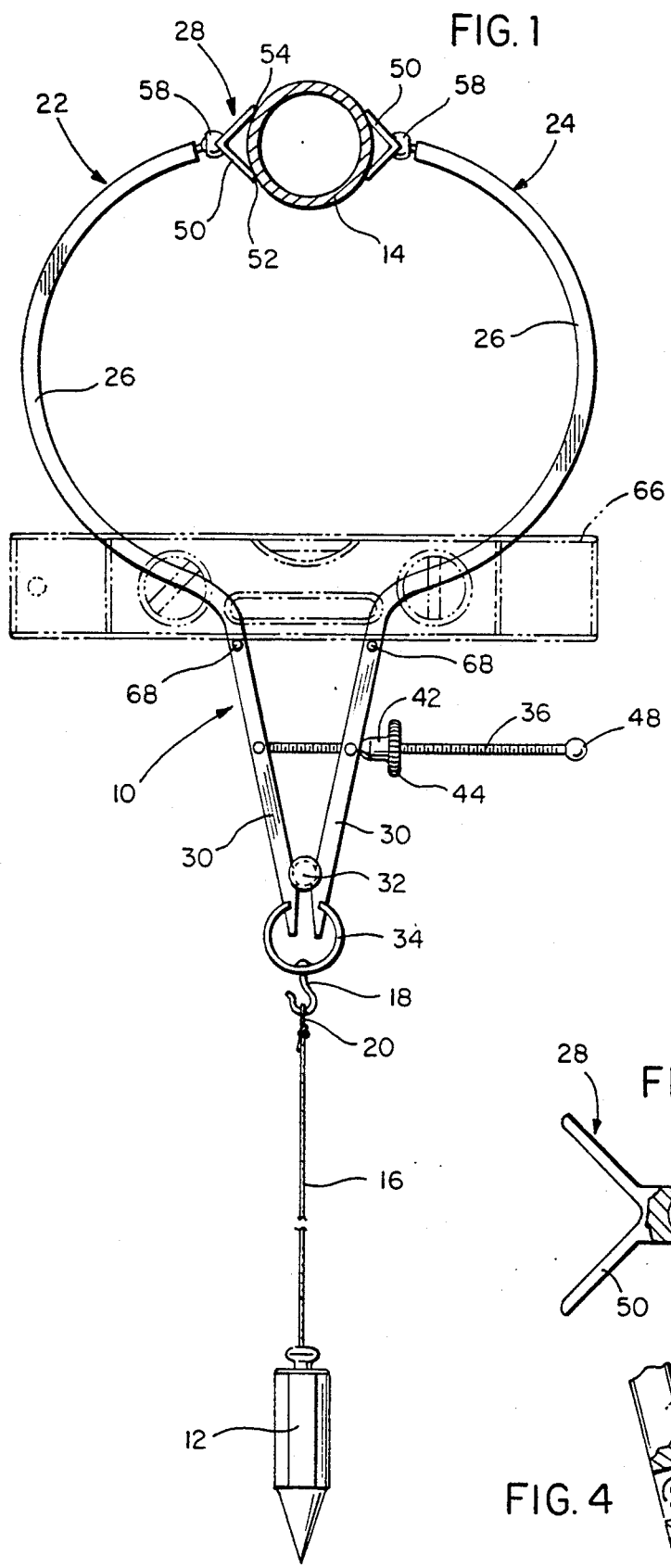
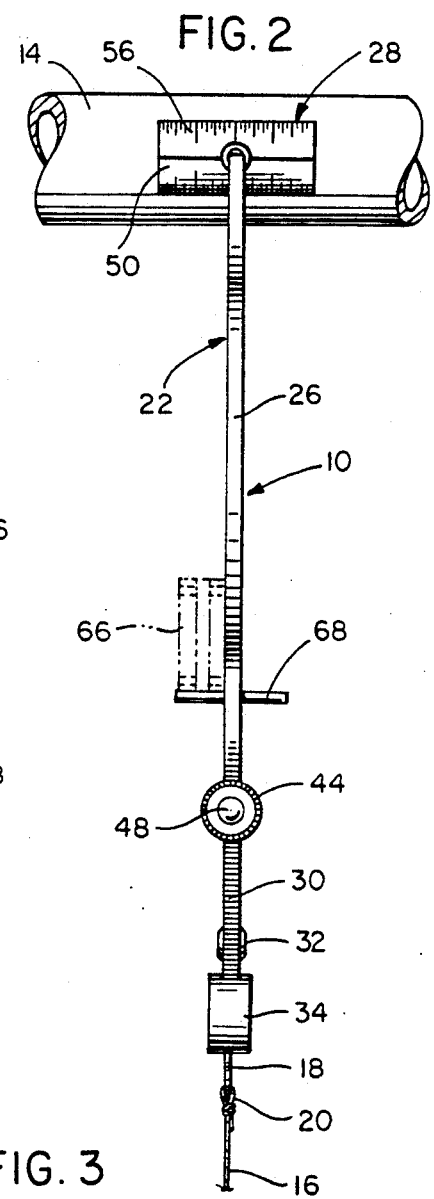
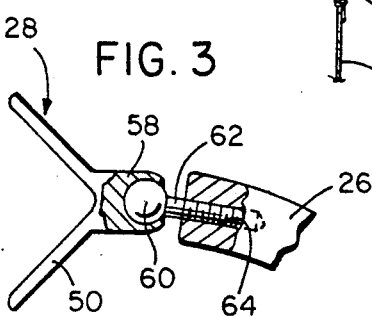
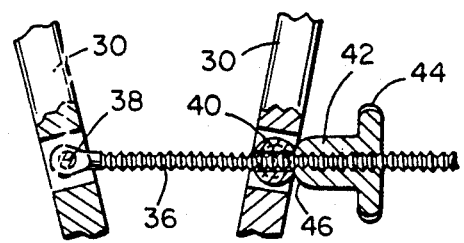

PLUMB BOB SUPPORT

BACKGROUND OF THE INVENTION

1. Field of the Invention

The present invention generally relates to a support for a plumb bob adapted for use by pipe fitters by which the plumb bob can be quickly and accurately suspended from a pipe or similar cylindrical object with the plumb bob being aligned with the center of the pipe thereby enabling the plumb bob to accurately indicate a center point of the pipe on a surface below the pipe. The support includes a pair of elongated, arcuate arms generally in the form of a caliper used for measuring outside diameters of pipes and the like with pipe engaging clips or jaws mounted on the facing ends of the arms by a universal ball and socket connection. The arms are pivotally connected and include a swivelly mounted hook to which the plumb bob can be connected. The arms also include laterally extending pins on which a bubble level can be supported to accurately position the pipe engaging clips in horizontal alignment thereby assuring that the hook and thus the plumb bob will be accurately aligned with the center line of the pipe. An adjustment screw and nut arrangement is used to move the arms to clampingly engage the pipe engaging clips with the pipe or enable the arms to move apart when releasing the support from the pipe.

2. Information Disclosure Statement

Various devices have been provided to locate the center line of a pipe and to provide an indicator aligned with the center line of the pipe to indicate the center line or center point of the pipe on an underlying surface. The following U.S. patents relate to this field of endeavor:

953,131
1,134,125
1,235,279
2,841,881
3,068,573

While devices supporting a plumb bob from a cylindrical object are generally known, none of the prior art utilizes the specific structure of the spring biased arms, the V-shaped clips connected thereto by a universal ball and socket connection, the crew mechanism to clamp the arms into supporting engagement with a pipe combined with the swivel hook supporting the plumb bob and lateral pins on the arms to support a bubble level to enable the clips to be horizontally aligned to assure that the plumb bob will be aligned with the center line of the pipe.

SUMMARY OF THE INVENTION

An object of the present invention is to provide a plumb bob support for use by a pipe fitter to quickly, easily and accurately support a plumb bob in depending relation to a pipe with the plumb bob being accurately vertically aligned with the center line of the pipe with the device being fully capable of one-man operation.

Another object of the invention is to provide a plumb bob support including a pair of arcuate or semi-circular arms pivotally connected at one end thereof and biased apart with a screw thread device being used to clamp the arms to the supporting pipe with each of the arms including an elongated, generally V-shaped clip connected to the arms by a universal ball joint connection to enable the clips to engage the periphery of the pipe at circumferentially spaced lines of contact thereby enabling the support to be used with various sizes of pipe within the limits of opening and closing movement of the clips on the free ends of the arms.

A further very important object of the invention is to provide a plumb bob support in accordance with the preceding objects in which each of the arms includes a lateral pin projecting from one or both sides thereof to support a bubble level, spirit level, torpedo level or the like to assure that the pipe engaging clips are in horizontal alignment thereby positioning a swivel hook at the lower end of the support in alignment with the center line of the pipe thereby enabling a plumb bob supported from the hook to be accurately aligned with the center line of the pipe.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of the plumb bob support of the present invention illustrating its association with a supporting pipe and illustrating a bubble level engaged with the leveling pins to assure accurate positioning of the support and plumb bob in relation to the center line of the supporting pipe.

FIG. 2 is a side elevational view of the plumb bob support in use as illustrated in FIG. 1.

FIG. 3 is a fragmental, detailed sectional view illustrating the universal ball joint connection between the pipe engaging clip and adjacent end of one of the arms forming the support.

FIG. 4 is a fragmental, sectional view illustrating the screw adjustment mechanism for enabling the arms to be assembled and disassembled in relation to a supporting pipe.

DESCRIPTION OF THE PREFERRED EMBODIMENT

Referring now specifically to the drawings, the plumb bob support of the present invention is generally designated by reference numeral 10 and is used to support a conventional plumb bob 12 from a pipe 14 or a similar cylindrical object with the tip of the plumb bob being in alignment with the center line of the pipe. The plumb bob 12 is provided with the usual supporting plumb line 16 and is connected to the support 10 by a swivel hook 18 that swivels about the longitudinal axis of the hook. A loop 20 on the upper end of the plumb line 16 is positioned in the hook in alignment with the swivel axis of the hook and in alignment with the center line of the pipe 14.

The support 10 includes a pair of opposed arms or legs 22 and 24 which are generally in the form of an outside caliper for use in measuring the outside diameter of a pipe or the outside dimensions of other objects. Each of the arms includes an arcuate or semi-circular portion 26 provided with a pipe engaging clip 28 at one end thereof and a straight portion 30 at the other end with the straight portions 30 converging as illustrating in FIG. 1 and being pivotally interconnected at 32 and provided with a spring structure 34 which biases the arms about the pivotal connection 32 in a manner to bias the pipe engaging clips 28 outwardly away from the pipe 14. A size adjustment screw 36 interconnects the straight portions 30 of the arms 22 and 24 with one end of the screw being pivotally connected to one of the arms 22 by pivot structure 38 with the screw extending through a pivot pin or shaft 40 in the straight portion of the other arm 24 and provided with an adjustment nut 42 thereon having a knurled flange 44 at one end thereof and a curved surface 46 at the other end for moving the arms 22 and 24 towards each other or permitting the spring to move the arms away from each other. The outer end of the screw 36 includes a knob 48 to retain the adjustment nut in position on the screw in a well-known manner. This structure is quite similar to that employed in an outside caliper.

Each of the clips 28 is in the form of a V-shaped saddle 50 engaging the external surface of the pipe 14 at spaced points 52 and 54. The V-shaped saddle 50 is elongated and may be 2″ in length and provided with a graduated scale 56 adjacent each of its edges with the graduated scale being divided into 1/16″ increments to enable accurate positioning of the support lengthwise of the pipe 14 with the graduated scale 56 enabling the support to be adjusted in relation to a particular point or other indicia on the external surface of the pipe 14. The central apex of the V-shaped saddle 50 includes a ball socket 58 which receives and engages a ball 60 having a threaded shank 62 threaded into a socket 64 in the free end of the arcuate portion 26 of each of the arms 22 and 24. The ball socket 58 and the entire clip 28 may be constructed of plastic material such as nylon which enables the socket 58 to engage more than one-half of the ball 60 and yet permit substantially 90° swivel movement of the saddle 50 in relation to the supporting arms.

The support can be used with pipes having diameters from ¾″ to 12″ or within the limits defined by the configuration of the arms or legs and the screw threaded adjustment. This enables a single plumb bob support to be obtained and used with almost any pipes that will be encountered. In using the plumb bob support, it is opened in a conventional manner by rotating the adjustment nut 42 until the clips can be engaged with the pipe 14. A bubble level 66 is then engaged with a pair of the laterally extending pins 68 mounted on the straight portions 30 of the arms 22 and 24 as illustrated in FIGS. 1 and 2 to enable the clips 28 to be horizontally aligned and engage the pipe on diametrically opposed surfaces thereof when the adjustment screw 42 is hand tightened thus supporting the swivel axis of the hook 18, the plumb line 16 and the plumb bob 12 in vertical alignment with the center of the pipe. This saves time and labor in the work place by eliminating the use of haphazard and inaccurate off-center knots which are frequently used to support a plumb bob from a pipe. The plumb bob support can also be used in both the horizontal and vertical position inasmuch as the point of connection of the plumb line with the hook will be in alignment with the center line of the pipe and thus the tip of the plumb bob will be in alignment with the center line of the pipe whether the pipe is disposed horizontally or vertically.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A plumb bob support for supporting a plumb bob from a pipe with the tip of the plumb bob in alignment with the center line of the pipe, said support comprising a pair of elongated arms, means pivoting one end of the arms together and means on the other ends of the arms facing inwardly in opposed relation to engage opposed surfaces of a pipe, means moving the arms about the pivotal connection to move the pipe engaging means toward and away from each other, means on each of the arms for engagement by a level to position the pipe engaging means in horizontal alignment and means on the arms to suspend a plumb bob therefrom in alignment with the pivotal connection between the arms whereby the pivotal connection and the plumb bob will be supported in alignment with the center line of the pipe, each of said arms including an arcuate portion having inwardly facing concave surfaces with the pipe engaging means mounted on one end of the arcuate portions, each of the arms also including a straight portion extending from the other end of the arcuate portion with the straight portions converging towards each other and being pivotally connected by said means pivoting one end of the arms together, said means moving the arms about the pivotal connection including spring means biasing the arms to move the pipe engaging means apart and an adjustment screw to manually move the arms and pipe engaging means towards each other for engaging the pipe engaging means with the pipe, each of said pipe engaging means including a substantially V-shaped saddle for engaging the pipe at circumferentially spaced lines to orient the apex of each V-shaped saddle in alignment with the center line of the pipe, and a universal ball and socket connection between the saddle and end portion of the arcuate portion of each arm enabling the pipe engaging saddles to be utilized with various size of pipe, said means to suspend a plumb bob including a swivel supporting hook mounted on said spring means in alignment with the pivotal connection between the arms and in alignment with the center line of the pipe when the pipe engaging saddles are horizontally aligned and clamped into engagement with the pipe, said plumb bob including a flexible plumb line having a loop at an upper end thereof for engaging said swivel hook.

2. The plumb bob support as defined in claim 1 wherein said means on each of said arms for engagement by a level includes laterally extending pin means rigidly mounted one each of said arms.

3. The plumb bob support as defined in claim 2 wherein each of said pin means includes a pin extending laterally from each side of each arm.

4. A plumb bob assembly supported from a cylindrical member with the tip of the plumb bob in alignment with the center line of the cylindrical member, said assembly including a plumb bob and a support comprising a pair of elongated arms, means pivoting one end of the arms together and means on the other ends of the arms facing inwardly, in opposed relation to engage opposed surfaces of the cylindrical member, means moving the arms about the pivotal connection to move the cylindrical member engaging means toward and away from each other, and means on each of the arms for engagement by a level to position the cylindrical member engaging means in horizontal alignment, means on the arms to suspend said plumb bob therefrom in alignment with the pivotal connection between the arms whereby the pivotal connection and the plumb bob will be supported in alignment with the center line of the cylindrical member, each of said cylindrical member engaging means including a substantially V-shaped saddle for engaging the periphery of the cylindrical member at circumferentially spaced lines to orient the apex of each V-shaped saddle in alignment with the center line of the cylindrical member, and a universal pivotal connection between the saddle and each arm enabling the saddles to be utilized with various sizes of cylindrical members, said means suspending the plumb bob including a hook, means supporting the hook swivelly from the arms and in alignment with the center line of the cylindrical member when the saddles are horizontally aligned and clamped into engagement with the cylindrical member, said plumb bob including a flexible plumb line having a loop at an upper end portion thereof engaging said swivel hook, said means on each of said arms for engagement by a level including a laterally extending pin rigidly mounted on each of said arms to orient the pins in horizontal alignment.

* * * * *